United States Patent
Shin

(10) Patent No.: US 6,950,320 B2
(45) Date of Patent: Sep. 27, 2005

(54) PORTABLE CHARGING APPARATUS HAVING A CHARGING BATTERY BUILT-IN

(76) Inventor: Hyung-Bum Shin, 5F Samhwa BD, 333-38, Chunho2Dong, Kangdong-Gu, Seoul 134-022 (KR)

( * ) Notice: Subject to any disclaimer, the term of this patent is extended or adjusted under 35 U.S.C. 154(b) by 0 days.

(21) Appl. No.: 10/504,504

(22) PCT Filed: Dec. 27, 2002

(86) PCT No.: PCT/KR02/02454

§ 371 (c)(1),
(2), (4) Date: Aug. 12, 2004

(87) PCT Pub. No.: WO03/069761

PCT Pub. Date: Aug. 21, 2003

(65) Prior Publication Data

US 2005/0127870 A1   Jun. 16, 2005

(30) Foreign Application Priority Data

Feb. 15, 2002 (KR) .................. 20-2002-0004476 U

(51) Int. Cl.$^7$ .................. H02M 3/315; H02J 7/14; H02J 7/00; H04M 1/00
(52) U.S. Cl. .................. 363/21.15; 320/106; 320/111; 320/114; 320/141; 455/572
(58) Field of Search .................. 363/21.15, 21.07, 363/24; 323/267; 307/64, 66; 379/438; 320/106, 320/103, 110, 111, 114; 429/9; 455/572

(56) References Cited

U.S. PATENT DOCUMENTS

| | | | | |
|---|---|---|---|---|
| 5,565,756 A | * | 10/1996 | Urbish et al. | 320/103 |
| 5,568,037 A | * | 10/1996 | Massaroni et al. | 320/106 |
| 5,733,674 A | * | 3/1998 | Law et al. | 429/9 |
| 5,764,030 A | * | 6/1998 | Gaza | 320/116 |
| 5,790,391 A | * | 8/1998 | Stich et al. | 363/24 |
| 5,812,660 A | * | 9/1998 | Suzuki et al. | 379/438 |
| 5,814,969 A | * | 9/1998 | Banyas | 320/112 |
| 5,847,541 A | * | 12/1998 | Hahn | 320/111 |
| 5,990,659 A | * | 11/1999 | Frannhagen | 320/106 |
| 6,014,011 A | * | 1/2000 | DeFelice et al. | 320/114 |
| 6,118,250 A | * | 9/2000 | Hutchison et al. | 320/110 |
| 6,157,173 A | * | 12/2000 | Baranowski et al. | 320/152 |
| 6,167,289 A | * | 12/2000 | Ball et al. | 455/572 |

\* cited by examiner

Primary Examiner—Pia Tibbits
(74) Attorney, Agent, or Firm—Lilling & Lilling P.C.

(57) ABSTRACT

Disclosed is a portable charging apparatus having a built-in charging battery, which can easily charge the charging battery of a cellular phone even in a place where home AC power or car power cannot be used and can be used for various kinds of portable equipment by means of using one charger. The present invention can charge a charging battery of a cellular phone using home AC power or car power. Furthermore, the charger of the present invention can easily charge the charging batteries of various digital mobile devices such as cellular phones using an internal charging battery included therein even in a place where home AC power or car power cannot be used.

1 Claim, 4 Drawing Sheets

PORTABLE CHARGING APPARATUS HAVING A CHARGING BATTERY BUILT-IN

TECHNICAL FIELD

The present invention relates to a portable charger of a cellular phone, a personal digital assistant (PDA) and the like (hereinafter, referred to as "portable electronic device"), and more particularly, to a portable charger having a built-in charging battery capable of easily charging a charging battery of a portable electronic device even in a place where domestic AC power or car power cannot be used for charging the battery.

BACKGROUND ART

A conventional charging device for charging a battery of a portable electronic device includes a desk top charger (DTC), a portable charger that travelers use, a vehicle charger in which a cigar jack power of a car is used as a charging power and so on. Among them, the portable charger rectifies domestic AC 110V/220V into DC power and steps down it using a switching mode power supply to DC power with a predetermined voltage level suitable for charging, to charge the charging battery of the portable electronic device.

FIG. 1 illustrates the configuration of a conventional portable charger. In FIG. 1, a reference numeral 1 denotes a charger body including a switching mode power supply and a charging circuit, a reference numeral 2 represents a power plug connected to a domestic electric outlet 6, a reference numeral 3 indicates an interface jack connected to an interface connector of a cellular phone 5, and a reference numeral 4 denotes a cable for connecting the charger body 1 to the interface jack 3.

In this configuration, when the interface jack 3 is coupled to the interface connector of the cellular phone 5 and the power plug 2 is connected to the electric outlet 6, home AC power applied to the charger body 1 through the power plug 2 is transformed into DC power having a predetermined voltage level to charge the charging battery of the cellular phone 5.

However, the aforementioned conventional portable charger can be use in only a place having the electric outlet 6 that supplies home AC power. Thus, the portable charger cannot perform its charging operation in a place having no electric outlet or in the event of suspension of electric supply. To solve this problem, the charger for a car has been proposed.

When a user is distant from the car, however, he or she cannot use the charger. Furthermore, in the case where the user needs both the portable charger and the vehicle charger, he or she suffers from an inconvenience of having to carry the two chargers and spends unnecessary money on purchasing them. Moreover, the conventional chargers can be used only for a specific type of portable equipment and they cannot be used for other types of portable equipment.

DISCLOSURE OF INVENTION

Therefore, the present invention has been in view of the above problems, and it is an object of the present invention to provide a portable charging apparatus having a built-in charging battery, which can easily charge the charging battery of a cellular phone even in a place where home AC power or car power cannot be used and can be used for various kinds of portable equipment by means of using one charger.

To accomplish the above object, according to an aspect of the present invention, there is provided a portable charging apparatus having a built-in charging battery comprising an AC power connector electrically connected to domestic AC power; an EMI filter for removing a noise component of AC power applied through the AC connector; a rectifier for rectifying the AC power applied from the EMI filter into DC power; a switching mode power supply for regulating the DC power inputted from the rectifier according to a predetermined duty ratio, to output charging current stepped down; an external charging battery connector electrically connected to the charging battery of a cellular phone through an interface connector of the cellular phone; a PWM controller outputting a pulse width modulation signal for controlling the voltage level of the current charging voltage such that charging voltage supplied to the external charging battery connector reaches a predetermined reference voltage and maintains it based on a predetermined voltage control signal; an internal charging battery for accepting the DC power from the switching mode power supply as charging current to store the electric energy of the DC power and providing the electric energy as charging current of the cellular phone; a transistor for switching electrical connection between the connection node of the output port of the switching mode power supply and the internal charging battery and the external charging battery connector according to the pulse width modulation signal outputted from the PWM controller; a photo-coupler for converting a predetermined current control signal into an optical signal and converting the optical signal into an electric signal having the duty ratio to apply it to the switching mode power supply; and a microprocessor for controlling a charging current control operation of the switching mode power supply and a charging voltage control operation of the PWM controller so as to supply charging current with a predetermined voltage level, outputted through the switching mode power supply, to the external charging battery connector and the internal charging battery, the microprocessor outputting the current control signal and voltage control signal to provide the charging current of the internal charging battery to the external charging battery connector.

The charging battery connector receives identification data including information about maximum charging voltage and maximum charging current of the charging battery of the cellular phone through the interface connector of the cellular phone and sends the identification data to the microprocessor. The microprocessor reads the identification data to set a maximum charging voltage value and a maximum charging current value of the charging battery and controls the operation of the switching mode power supply and PWM controller based on the set maximum charging voltage and maximum charging current values.

Furthermore, the portable charging apparatus having a built-in charging battery of the invention further comprises a car power connector that is connected to a cigar jack connector of a car to accept DC power with a predetermined voltage level. The microprocessor controls the charging voltage control operation of the PWM controller so as to apply charging current supplied from the car power connector to the external charging battery connector.

According to the above-described configuration, the portable charging apparatus of the invention can easily charge the charging battery of a cellular phone even in a place where home AC power or vehicle power is difficult to use for charging the charging battery.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

The present invention will now be described in detail in connection with preferred embodiments with reference to the accompanying drawings.

Figure 2:
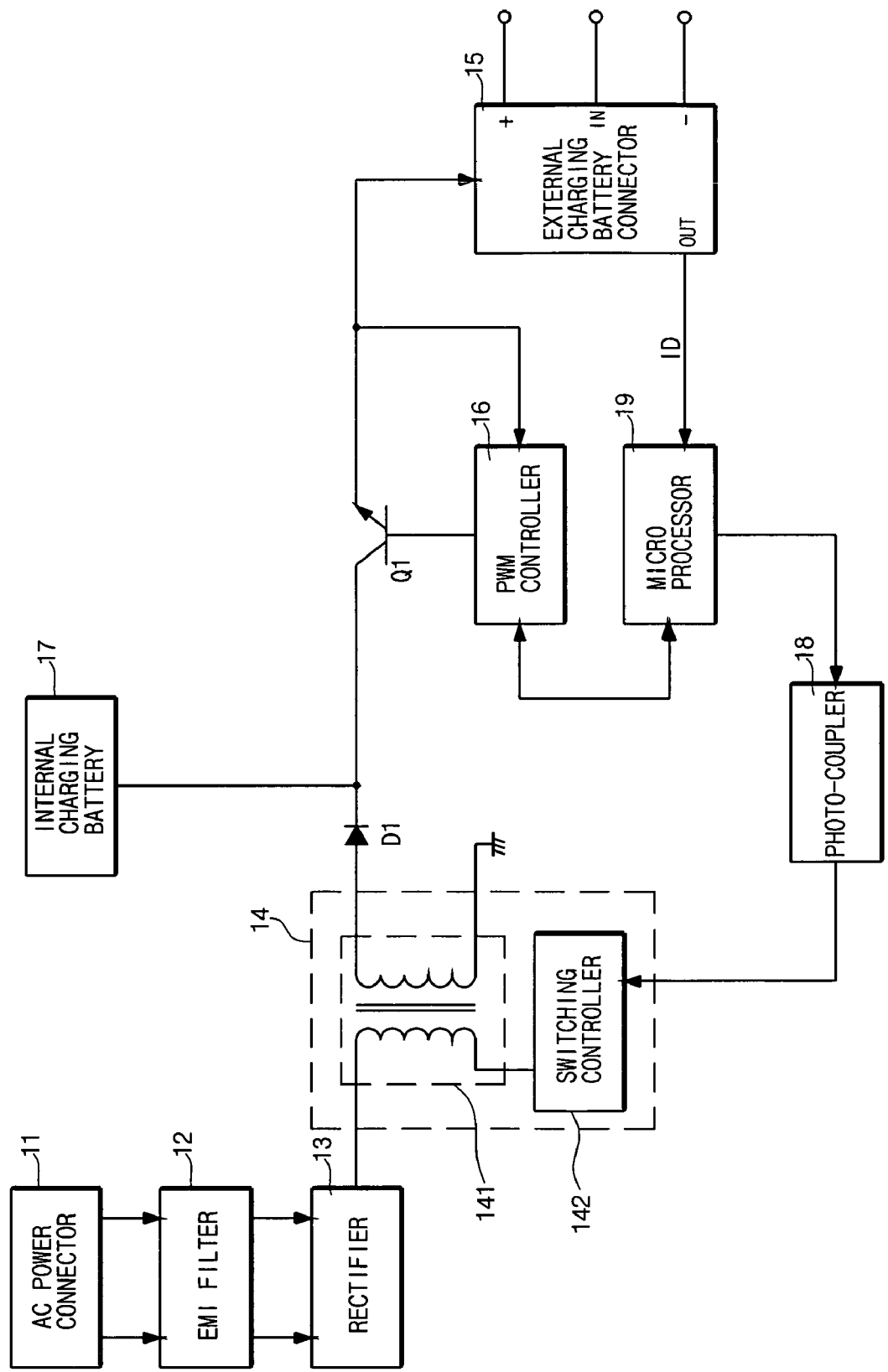
FIG. 2 is a block diagram showing the internal configuration of a portable charger having a built-in charging battery according to an embodiment of the present invention.

FIG. 2 is a block diagram showing the internal configuration of a portable charging apparatus having a built-in charging battery according to an embodiment of the present invention. In FIG. 2, a reference numeral 11 denotes an AC power connector electrically connected to a home AC 110V or 220V power supply, a reference numeral 12 represents an electromagnetic interference (EMI) filter for removing a nose component of AC power supplied through the AC power connector 11, and a reference numeral 13 indicates a rectifier for rectifying the AC power applied thereto through the EMI filter into DC power. In addition, a reference numeral 14 denotes a switching mode power supply duty that regulates the DC power inputted from the rectifier 13 according to a predetermined duty ratio to provide charging current stepped down. The switching mode power supply includes a coil 141 for regulating the input DC power to generate induced current stepped down, and a switching controller 142 for controlling the coil 141 according to the duty ratio to adjust the quantity of charging current flowing into the charging battery.

A reference numeral 15 represents an external charging battery connector that is electrically connected to the charging battery of the cellular phone through an interface connector of the cellular phone. It is connected to the charging battery using an interface jack (not shown) coupled to the interface connector of the cellular phone. The external charging battery connector 15 includes a positive input port (+), a negative input port (−) and an identification data input port IN that are electrically connected to a charging port, a ground port and an identification port of the charging battery (not shown), respectively. The external charging battery connector applies predetermined identification data ID transmitted from the identification port of the charging battery to a microprocessor, which will be described below, through an identification data output port. The identification data ID includes characteristic information such as maximum charging voltage, maximum charging current or the like of the charging battery.

In FIG. 2, a reference numeral 16 denotes a PWM (Pulse Width Modulation) controller that outputs a pulse width modulation signal for controlling the voltage level of the current charging voltage such that the charging voltage provided to the external charging battery connector reaches a predetermined reference voltage and holds the voltage level based on a predetermined voltage control signal provided by the microprocessor. The output port of the PWM controller 16 is connected to the base of a transistor Q1 and the output port of the switching mode power supply 14 is coupled to the collector of the transistor Q1 through a reverse current limiting diode D1. The charging current input port of the external charging battery connector 15 is connected to the emitter of the transistor Q1 and the emitter is also coupled to a voltage feedback signal input port of the PWM controller 16.

A reference numeral 17 denotes an internal charging battery that stores electric energy using the DC power supplied from the switching mode power supply 14 as charging current. The internal charging battery 17 serves as a secondary charging power supply for providing the power to the external charging battery connector 15. The internal charging battery 17 includes a predetermined overcharging prevention circuit for preventing overcharging set inside thereof. The overcharging prevention circuit is well known in the art so that explanation therefor is omitted.

In FIG. 2, a reference numeral 18 represents a photo-coupler that converts a predetermined current control signal provided by the microprocessor into an optical signal and converts the optical signal into an electric signal having a predetermined duty ratio to apply it to the switching mode power supply 14. The switching controller 142 of the switching mode power supply 14 controls the operation of the coil 141 using the electric signal supplied from the photo-coupler 18 as a control signal.

Figure 3:
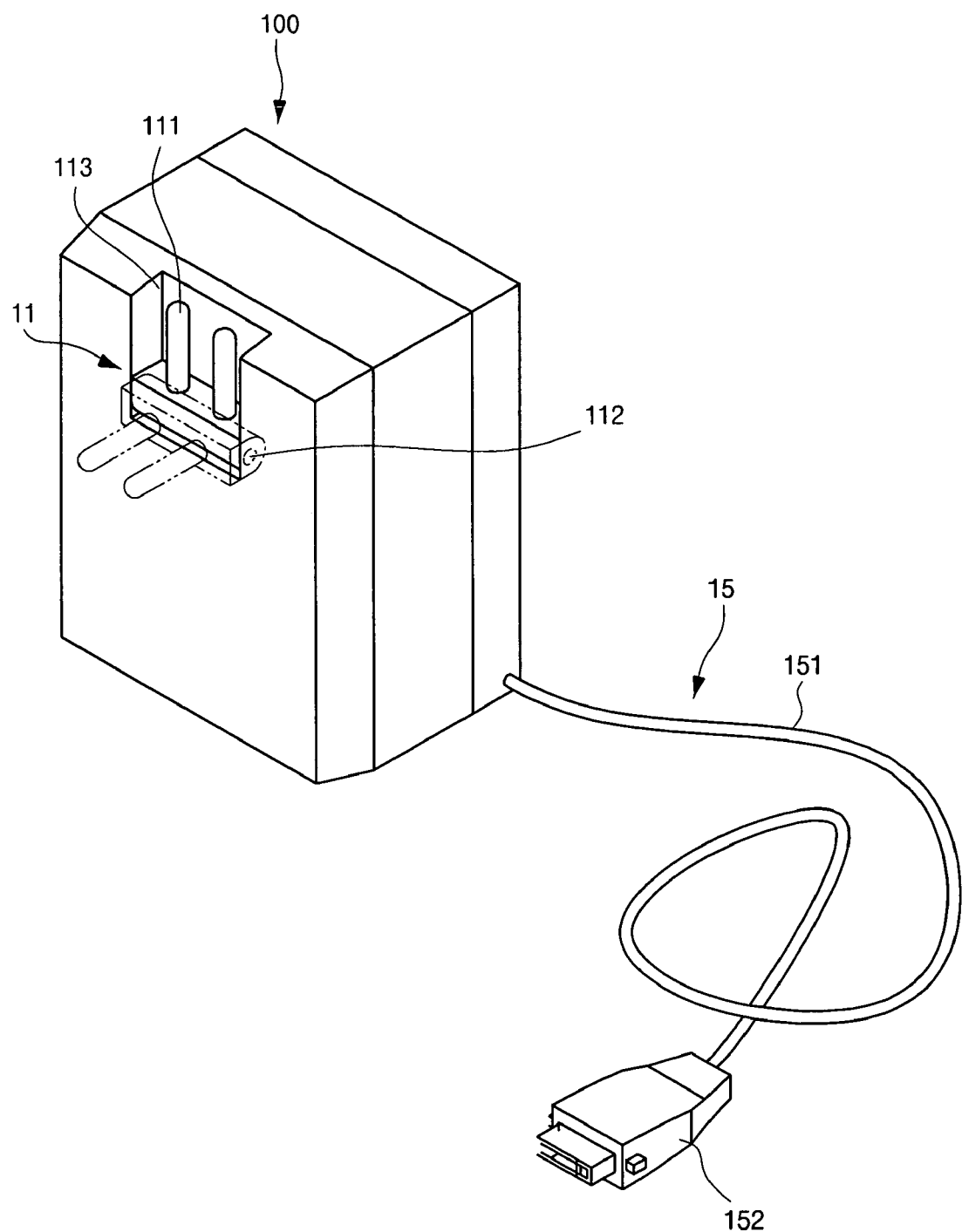
FIG. 3 is a perspective view showing the external structure of the portable charger having a built-in charging battery shown in FIG. 2.

FIG. 3 is a perspective view showing the external structure of the portable charger having the built-in charging battery shown in FIG. 2. Like reference characters designate corresponding parts in FIGS. 2 and 3.

IN FIG. 3, a reference numeral 100 denotes the body of the charger including the internal configuration (electric circuit) of FIG. 2. An AC power connector II is attached to one side of the charger's body 100. The AC power connector 11 includes a power plug 111 inserted into a home electric outlet. The power plug 111 is folded at a right angle through a rotation axis 112 set in the body 100 of the charger so that it is fixed at a right angle to the surface of the body 100 when used (shown in dotted lines) but set in a recess 113 formed at one side of the body 100 of the charger when it is not used.

Figure 1:
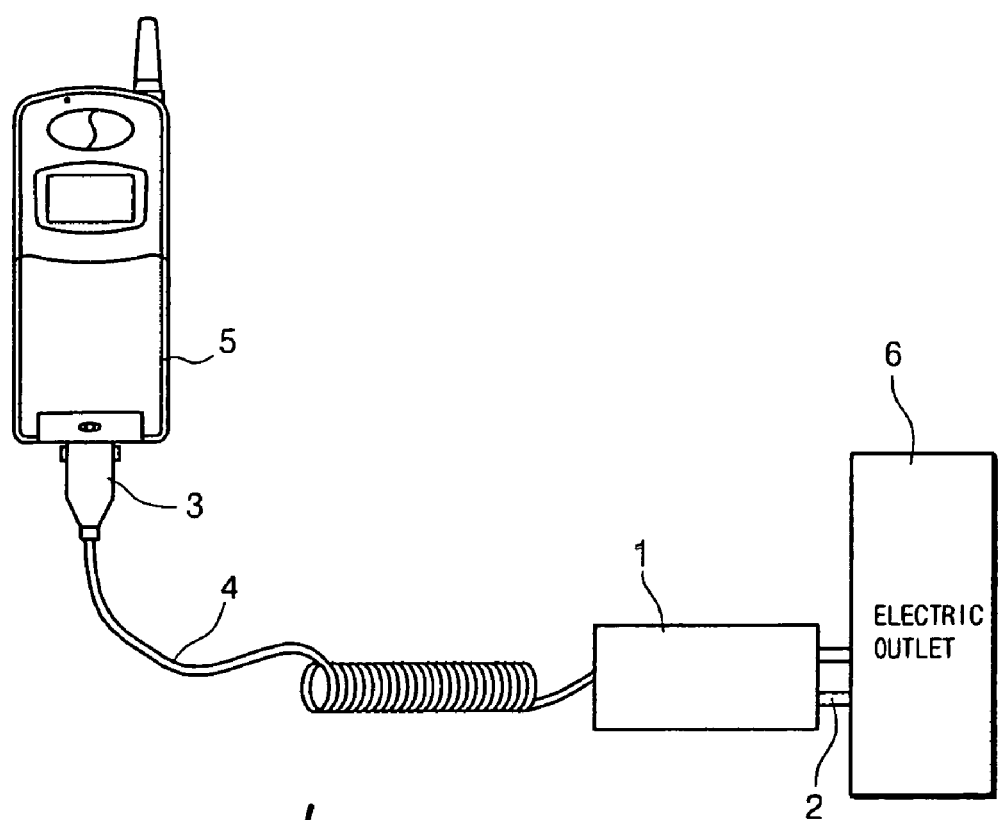
FIG. 1 illustrates the configuration of a conventional portable charger.

Furthermore, the external charging battery connector 15 including a cable 151 and an interface jack 152 electrically connected to the interface connector (referring to FIG. 1) of a cellular phone is attached to the other side of the body 100 of the charger. Internal ports (not shown) of the interface connector of the cellular phone are electrically connected to the positive port, negative port and identification data input port IN of the external charging battery connector 15 to transmit identification data of the charging battery of the cellular phone and be provided with charging current by the charger of the invention.

The operation of the charger of the prevent invention is explained below.

In the case where charging power of the charging battery of the cellular phone is domestic AC 110V/220V, a user who wants to charge his/her cellular phone in a place where home AC power is difficult to use inserts the power plug 111 into a home electric outlet and connects the interface jack 152 of FIG. 3 with the interface connector of the cellular phone. Then, AC power inputted to the charger through the AC power connector 11 filters its noise component while passing through the EMI filter 12 and is rectified by the rectifier 13 into DC power. The rectified DC power is applied to the switching mode power supply 14 to provide operation power to the charger of the invention through a predetermined operation power supply circuit (not shown).

The charger of the invention basically uses a part of the DC power, applied to the switching mode power supply 14 through the rectifier 13, as its operation power. When the internal charging battery 17 is used as a charging power supply for supplying charging power to the charging battery of the cellular phone, the charger uses a part of the charging power of the internal charging battery as its operation power. The operation power supply circuit is well known in the art so that explanation therefor is omitted.

The microprocessor 19 applies a predetermined current control signal that is a pulse width modulation signal to the photo-coupler 18 according to predetermined maximum charging voltage and maximum charging current of the internal charging battery 17, and reads identification data ID of the charging battery of the cellular phone, transmitted from the external charging battery connector 15, to set maximum charging voltage and maximum charging current of the charging battery. In addition, the microprocessor sets the maximum charging voltage as the reference voltage of the PWM controller 16.

The photo-coupler 18 outputs an electric signal with a predetermined duty ratio corresponding to the current control signal transmitted from the microprocessor 19 to the switching controller 142. The switching controller 142 controls the operation of the coil 141 according to the duty ratio of the electric signal so as to adjust the quantity of charging current supplied to the external charging battery connector 15 and internal charging battery 17.

The PWM controller 16 compares the voltage at the connection node of the emitter of the transistor Q1 and the external charging battery connector 15 with a predetermined reference voltage at a predetermined cycle, to control an on/off driving cycle of the transistor Q1 such that the current charging voltage reaches to the reference voltage and holds the voltage level. When the current charging voltage reaches the reference voltage, the PWM controller 16 informs the microprocessor 19 of it. Then, the microprocessor 19 applies a predetermined current control signal to the photo-coupler 18 so as to reduce the quantity of charging current supplied from the switching mode power supply 14.

While the microprocessor 19 controls the operation of the switching mode power supply 14 according to the predetermined maximum charging voltage and maximum charging current of the internal charging battery 17, it adjusts the quantity of charging current supplied from the switching mode power supply based on the current charging voltage state of the cellular phone so as to prevent the charging battery connected to the switching mode power supply 17 from overcharging. When the internal charging battery 17 is fully charged, the internal charging battery senses it through the internal overcharging prevention circuit and automatically blocks charging current from flowing thereinto.

According to the aforementioned operation, the charging current supplied from the switching mode power supply 14 charges the internal charging battery 17 through the diode D1 and it is applied to the external charging battery connector 15 to stably charge the charging battery of the cellular phone.

Next, the case that the internal charging battery 17 is used for charging the charging battery of the cellular phone is explained.

First, the internal charging battery 17 is fully charged according to the aforementioned operation. A user who wants to charge his/her cellular phone in a place where home AC power cannot be used for charging it connects the interface jack 152 of FIG. 3 with the interface connector of the cellular phone. In this case, a part of the charging current of the internal charging battery 17 is provided to the charger of the invention as its operation power through the operation power supply circuit (not shown).

Then, the microprocessor 19 reads the identification data ID of the charging battery of the cellular phone, transmitted from the external charging battery connector 15, to set maximum charging voltage and maximum charging current of the charging battery, and sets the maximum charging voltage as the reference voltage of the PWM controller 16.

The PWM controller 16 compares the current charging voltage of the charging battery connected to the external charging battery connector 15 with the set reference voltage to control the on/off driving cycle of the transistor Q1 such that the current charging voltage reaches the set reference voltage and maintains the reference voltage level, to thereby charge the charging battery of the cellular phone.

In this embodiment, the inner charging battery 17 appropriately selects its charging voltage (more than 8V, for example) and charging current to accept charging capacities of various charging batteries connected to the external charging battery connector 15.

Figure 4:
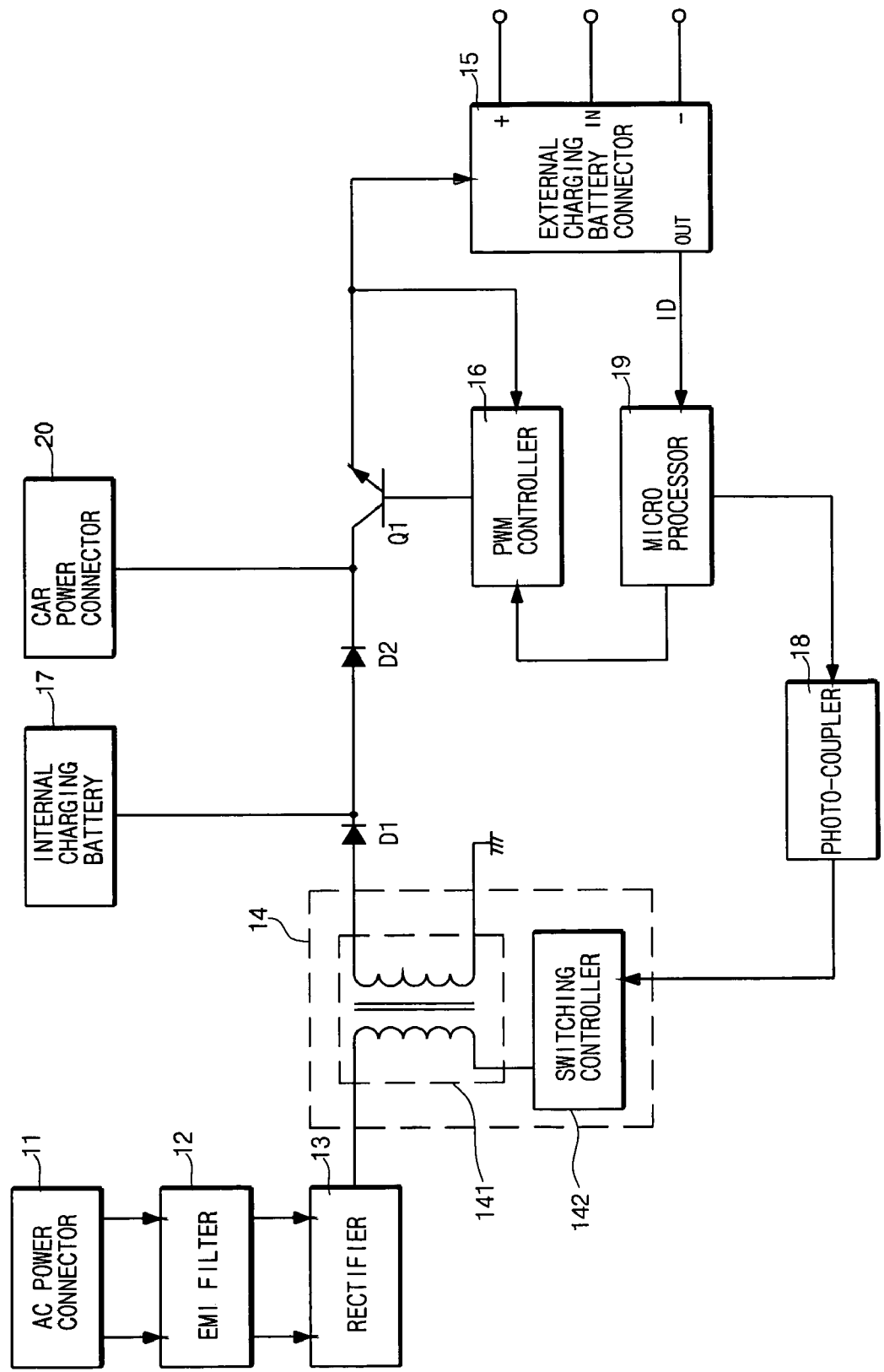
FIG. 4 is a block diagram showing the internal configuration of a portable charger having a built-in charging battery according to another embodiment of the present invention.

FIG. 4 is a block diagram showing the internal configuration of a portable charger having a built-in charging battery according to another embodiment of the present invention. Like reference characters designate corresponding parts in FIGS. 2 and 4 and explanation for the parts is omitted.

In FIG. 4, the reference numeral 20 denotes a car power connector that is connected to a cigar jack connecting terminal (not shown) of a car to receive DC power (referred to as "car power" hereinafter) having a predetermined voltage level (for example, 12V approximately). A diode D2 is connected between the car power connector 20 and the internal charging battery 17. The diode D2 blocks current from flowing from the car power connector 20 to the internal charging battery 17. This is for the purpose of preventing the internal charging battery from being damaged because the voltage level of the car power is generally higher than the maximum charging voltage of the internal charging battery 17.

Accordingly, in the case where the maximum charging voltage of the internal charging battery 17 is identical to or higher than the voltage level of the car power, it is possible that the diode D2 is eliminated and the charging battery of the cellular phone and the internal charging battery are charged using the car power. The charging operation using the car power is identical to the charging operation using the internal charging battery 17 so that explanation for the charging operation using the car power is omitted.

In FIG. 2, the reference numeral 19 denotes the microprocessor that controls the charging current control operation of the switching mode power supply 14 and the charging voltage control operation of the PWM controller 16, to apply charging current with a predetermined voltage level supplied through the switching mode power supply 14 to the external charging battery connector 15 and the internal charging battery 17. The microprocessor 19 reads identification data ID of the charging battery of a cellular phone, transmitted from the external charging battery connector 15 when the charging battery is connected to the external charging battery connector, to set the maximum charging voltage and maximum charging current, and controls the operation of the switching mode power supply 14 and PWM controller 16 based on the maximum charging voltage and maximum charging current.

INDUSTRIAL APPLICABILITY

As described above, the present invention can charge a charging battery of a cellular phone using home AC power or car power. Furthermore, the charger of the present invention can easily charge the charging batteries of various digital mobile devices such as cellular phones using an internal charging battery included therein even in a place where home AC power or car power cannot be used.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A portable charging apparatus having a built-in charging battery comprising:
    an AC power connector electrically connected to domestic AC power;
    an EMI filter for removing a noise component of AC power applied through the AC connector;
    a rectifier for rectifying the AC power applied from the EMI filter into DC power;
    a switching mode power supply for regulating the DC power inputted from the rectifier according to a predetermined duty ratio, to output charging current stepped down;
    an external charging battery connector electrically connected to the charging battery of a cellular phone through an interface connector of the cellular phone;
    a PWM controller outputting a pulse width modulation signal for controlling a voltage level of a current charging voltage such that the charging voltage supplied to the external charging battery connector reaches a predetermined reference voltage and maintains it based on a predetermined voltage control signal;
    an internal charging battery for accepting the DC power from the switching mode power supply as charging current to store the electric energy of the DC power and providing the electric energy as charging current of the cellular phone;
    a transistor for switching electrical connection between the connection node of an output port of the switching mode power supply and the internal charging battery and the external charging battery connector according to the pulse width modulation signal outputted from the PWM controller;
    a photo-coupler for converting a predetermined current control signal into an optical signal and converting the optical signal into an electric signal to apply it to the switching mode power supply; and
    a microprocessor for controlling a charging current control operation of the switching mode power supply and a charging voltage control operation of the PWM controller so as to supply charging current with a predetermined voltage level, outputted through the switching mode power supply, to the external charging battery connector and the internal charging battery, the microprocessor outputting the current control signal and voltage control signal to provide the charging current of the internal charging battery to the external charging battery connector,
    wherein the charging battery connector receives identification data including information about maximum charging voltage and a maximum charging current of a rechargeable battery of the cellular phone through the interface connector of the cellular phone and sends the identification data to the microprocessor, and
    the microprocessor reads the identification data to set a maximum charging voltage value and a maximum charging current value of a rechargeable battery and controls the operation of the switching mode power supply and PWM controller based on set maximum charging voltage and maximum charging current values.

* * * * *